July 11, 1961
E. V. SUNDT
2,991,665
MOTOR DRIVEN SPEED REDUCER
Filed Jan. 24, 1958
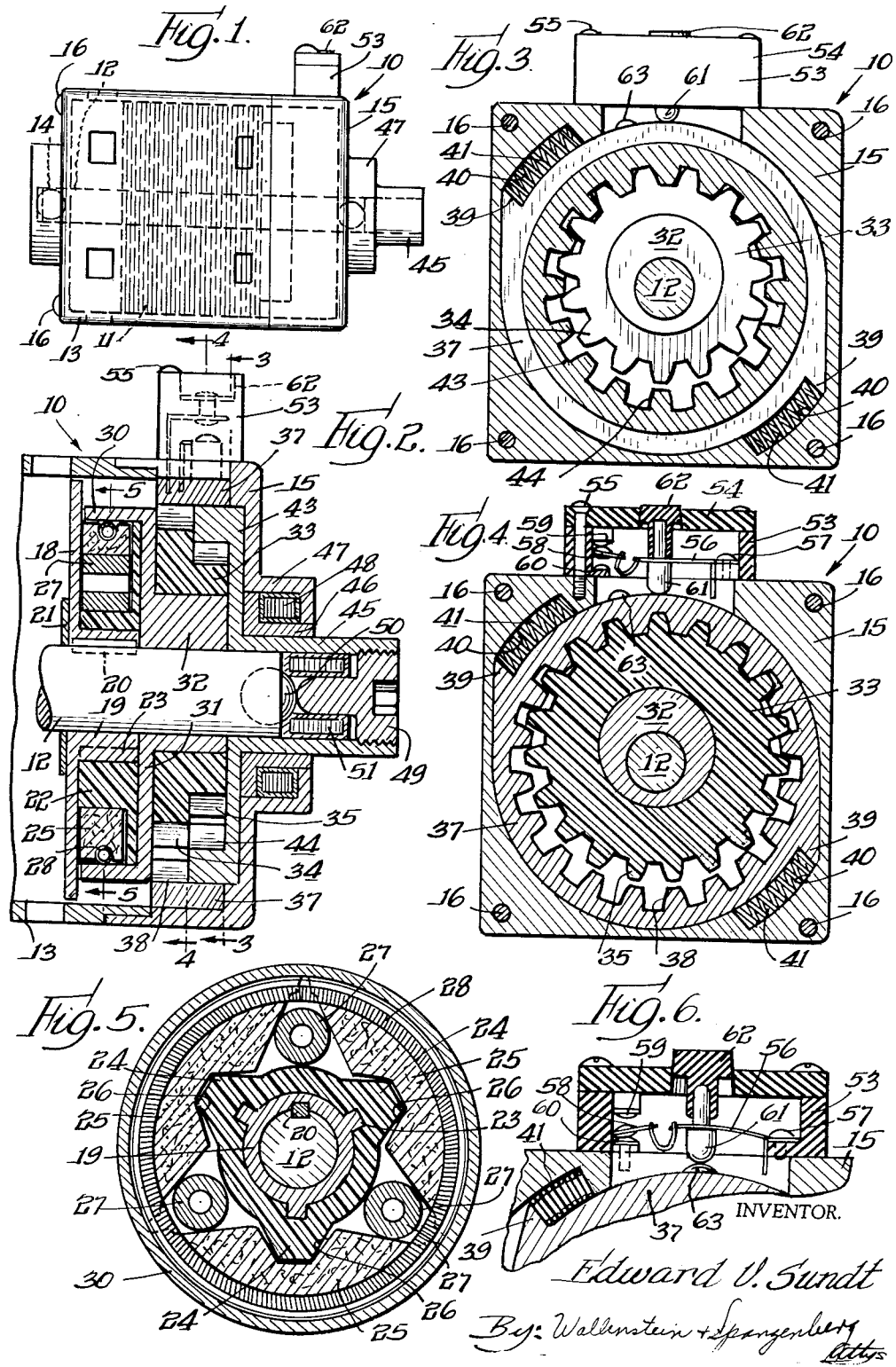
INVENTOR.
Edward V. Sundt
By: Wallenstein + Spangenberg
Attys

United States Patent Office 2,991,665
Patented July 11, 1961

2,991,665
MOTOR DRIVEN SPEED REDUCER
Edward V. Sundt, Wilmette, Ill.
(1865 Miner St., Des Plaines, Ill.)
Filed Jan. 24, 1958, Ser. No. 710,903
2 Claims. (Cl. 74—805)

The principal object of this invention is to provide a motor driven speed reducer which is protected against both under-speed and over-torque conditions of load, which is particularly useful in connection with motors which are incapable of delivering full power until their rated speed is realized, such as single and split phase electric motors, induction electric motors, electric motors having starter windings, and small gasoline and diesel motors, which only connects the torque load to the motor when the motor is operating at substantially its optimum speed, which is also particularly useful in connection with motors which generate high torques in starting, such as a universal type of electric motor, which stops operation of the motor when the torque load becomes excessive to prevent excessive increase of current in the electric motor, which is simple and compact in construction and foolproof in operation, and which is concentric with the motor shaft.

Briefly, the motor driven speed reducer of this invention includes a motor having a shaft rotated thereby. A clutch is concentrically arranged about the shaft and it includes a driving part driven by the shaft and a driven part driven by the driving part when the clutch is engaged. The clutch is preferably a speed responsive clutch which includees means responsive to the speed of rotation of the shaft for connecting the driven part to the driving part when the speed of rotation of the shaft reaches a predetermined value.

It also includes a differential reducer which is also concentrically arranged about the motor shaft and which includes a driving part driven by the driven part of the clutch and a driven part driven by the driving part at reduced speed. More specifically it includes an eccentric driven by the driven part of the clutch, and an oscillating member oscillated by the eccentric and having a pair of rings of teeth thereon. A first gear member has teeth meshing with one of the rings of teeth on the oscillating member and is normally held against rotation for controlling the oscillating member. A second gear member has teeth meshing with the other ring of teeth on the oscillating member and is driven thereby at reduced speed, this second gear member forming the output member or driven part of the speed reducer.

The motor driven speed reducer further includes a control device for the motor and means responsive to the torque load on the differential reducer for operating the control device to stop operation of the motor when the torque load exceeds a predetermined value. Towards this end, means are provided for resiliently securing the first gear member of the differential reducer against rotation but allowing rotative movement thereof when the torque load in the differential reducer reaches a predetermined value, and the control device is operated by this movement of the first gear member to stop operation of the motor when said torque load exceeds said predetermined value.

Further objects of this invention are directed to the details of construction of the motor driven speed reducer and to the relationships between the component parts thereof.

Other objects and advantages of this invention will become apparent to those skilled in the art upon reference to the accompanying specification, claims and drawing in which:

FIG. 1 is a side elevational view of one form of the motor driven speed reducer of this invention.

FIG. 2 is a vertical sectional view through the right hand portion of the motor driven speed reducer as illustrated in FIG. 1.

FIG. 3 is a vertical sectional view taken substantially along the line 3—3 of FIG. 2.

FIG. 4 is a vertical sectional view taken substantially along the line 4—4 of FIG. 2.

FIG. 5 is a vertical sectional view taken substantially along the line 5—5 of FIG. 2.

FIG. 6 is a partial sectional view of the control device for the motor illustrating the control device in position to stop operation of the motor, the control device being illustrated in FIG. 4 in a position to permit operation of the motor.

The motor driven speed reducer of this invention is generally designated at 10 and, as illustrated in FIG. 1, it includes an electric motor structure 11, such as a universal type of electric motor, and a rotating shaft 12, the shaft having a rated speed, for example, of 1750 r.p.m. The motor structure 11 is housed within a housing 13, one end of the shaft 12 being journaled for rotation therein and having its lengthwise movement limited by a thrust ball 14. The housing 13 is provided with an end cover 15 which is secured in place by tie-bolts 16. The speed responsive clutch and the differential reducer are located within the cover 15 and are concentrically arranged about the shaft 12.

Referring more particularly to FIGS. 2 and 5, the speed responsive clutch includes a driving part or coupler 18 having a sleeve boss 19 secured to the shaft 12 by a key 20. The driving part 18 is preferably a diecast part and is held against longitudinal movement along the shaft 12 by a fiber washer 21 secured to the shaft. An impeller 22 is splined onto the sleeve 19 of the driving part 18 by means of splines 23, the impeller 22 thereby rotating with the shaft 12. The impeller 22 is preferably formed of rubber, nylon or the like so as to provide a resilient driving connection. The impeller is provided with radial projections 24 which are received in notches 26 in friction shoes 25. The friction shoes 25 are substantially segmentally shaped and are preferably made from asbestos, Bakelite or the like. By reason of the coaction between the projections 24 on the impeller 22 and the notches 26 in the friction shoes 25, the friction shoes 25 are resiliently rotated as the shaft 12 is rotated. The friction shoes 25 are peripherally provided with grooves in which is located a garter spring 28, the spring 28 operating to radially collapse the friction shoes toward the shaft 12. Arranged between the friction shoes are a plurality of rollers 27, which are preferably steel rollers, these rollers being urged radially outwardly by centrifugal force as the clutch is rotated by the shaft 12. These radial outward movements of the rollers 27 operate to move the friction shoes 25 radially outwardly against the action of the garter spring 28 when the speed of rotation of the shaft 12 reaches a predetermined value. For example, the friction shoes 25 are moved outwardly by the rollers 27 when the speed of rotation of the shaft 12 reaches about 1200 r.p.m. and are moved radially inwardly when the speed of rotation of the shaft decreases to about 1000 r.p.m. The clutch also includes a driven part 31 having a flange 30 encompassing the friction shoes 25. Thus, when the friction shoes 25 are moved outwardly by centrifugal force the driven part 31 is automatically connected or coupled to the driving part 18 for rotation thereby.

The driven part 31 of the speed responsive clutch is preferably formed of powdered steel or the like which is impregnated with a suitable lubricant. It is rotatably mounted upon the shaft 12, the lubricant within the driven part 31 lubricating the running surfaces between it and the shaft 12. The driven part 31 is provided with an eccentric portion 32 which operates as the driving part of the differential reducer. Rotatably mounted on the eccentric 32 is an oscillating member 33 formed of nylon or the like. This oscillating member 33 is provided with two rings of gear teeth 34 and 35, the ring 34 having 19 teeth and the ring 35 having 15 teeth. Mounted in the cover 15 for limited rotation is a first gear member 37 having internal teeth 38 meshing with the ring of teeth on the oscillating member 33. The teeth 38 in the first gear member 37 are 20 in number. The gear member 37 is normally held against rotation and due to the reaction between the teeth 35 and 38 substantially 20 revolutions of the eccentric 32 cause one revolution of the oscillating member 33.

The first gear member 37, as shown more clearly in FIGS. 3 and 4, is provided with a pair of projections 39 which are received in recesses 40 in the cover 15. Springs 41 are located in the recesses 40 and engage the projections 39 for resiliently maintaining the gear member 37 in the position illustrated in FIGS. 3 and 4. In this way, the gear member 37 is normally resiliently secured against rotation. The other ring of gear teeth 35 on the oscillating member 33 meshes with internal teeth 44 on a second gear member 43, this second gear member 43 being journaled for rotation by a sleeve extension 45. The internal teeth 44 on the second gear member 43 are 16 in number so that for substantially each 16 revolutions of the oscillating member 33 the second gear member is rotated through 1 revolution. The second gear member 43 which forms the driven part of the differential reducer is preferably made of powdered iron or the like. The first gear member 37 is also preferably made of powdered iron or the like. These gear members 43 and 37 are preferably impregnated with a suitable lubricant.

The formula for determining the speed reduction ratio between the second gear member 43 and the eccentric 32 and hence the shaft 12 may be expressed as follows:

$$\text{Ratio} = \frac{1 - \frac{ac}{bd}}{1}$$

where $a$, $b$, $c$, and $d$, respectively are the numbers of teeth on the first gear member 37, the first ring 34 of teeth on the oscillating member 33, the number of teeth in the second ring 35 of teeth on the oscillating member 33, and the number of teeth on the second gear member 43. By substituting the appropriate values the speed reduction ratio becomes $$\text{Ratio} = \frac{\left(1 - \frac{20 \times 15}{19 \times 16}\right)}{1} = \frac{76}{1}$$

Various speed reduction ratios may be obtained by appropriately selecting gear ratios between the first gear member 37, the oscillating member 33 and the second gear member 43.

The sleeve portion 45 of the second gear member or driven part 43 of the differential reducer is journaled for rotation in a bearing 46 pressed-fit into a boss 47 on the cover 15. The bearing 46 is preferably formed from powdered bronze and the annular space between the boss 47 and the bearing 46 is preferably filled with a lubricant saturated wick 48 for supplying lubricant to the running surfaces between the bearing 46 and the sleeve 45 of the second gear member 43. The sleeve portion 45 also rotatably supports the rotating shaft 12 and forms an outboard bearing therefor.

The sleeve portion 45 is provided with an adjustable screw 49 which engages a ball 50 for adjusting the end play of the shaft 12. A lubricant saturated wick 51 is arranged within the sleeve portion 45 for supplying lubricant to the running surfaces between the sleeve portion 45 and the shaft 12. The device to be operated by the motor driven speed reducer of this invention is connected to the second gear member or driven part 43 of the motor driven speed reducer for operation at reduced speed.

A control device for the motor 11, in the form of a snap-acting over-center switch is carried by the cover 15. It includes a housing portion 53 and a cover portion 54 which are secured together and to the cover 15 by screws 55. The switch includes an over-center snap-acting blade 56 which is secured at one end to a terminal 57. The other end of the blade carries a contact 58 which is adapted to alternately engage terminals 59 and 60. The blade 56 carries a cam follower 61 and a reset button 62 which extends through an opening of the cover portion 54. The terminals 57 and 59 are connected in series with the motor 11 so that when the contact 58 engages the terminal 59 the motor 11 is allowed to operate. This position of the control device is illustrated in FIG. 4. When, however, the blade 56 is operated to snap the contact 58 from the terminal 59 into engagement with the terminal 60 the circuit to the motor 11 is broken to stop operation of the motor. The terminals 57 and 60 may be connected in series with a suitable alarm or indicating device to indicate stopping of the motor when the contact 58 engages the terminal 60. The position of the switch for accomplishing this is illustrated in FIG. 6.

The first gear member 37 carries a cam 63 which is normally spaced from the cam follower 61 but which may be moved under the cam follower 61 against the action of the springs 41 when the torque load on the differential reducer reaches a predetermined value as determined by the springs 41. The springs 41, as expressed above, normally secure the first gear member 37 against rotation. If, however, the torque load on the differential reducer should become excessive the reaction of the oscillating member 33 against the first gear member 37 causes the gear member 37 to move from the position illustrated in FIG. 4 to the position illustrated in FIG. 6 against the action of the springs 41. As a result, the cam 63 on the first gear member 37 engages the cam follower 61 to move the switch from the position illustrated in FIG. 4 to the position illustrated in FIG. 6. This stops operation of the motor and causes the alarm or indicating device to operate. When the motor is thus stopped the torque load decreases and the springs 41 return the first gear member 37 to the position illustrated in FIG. 4. However, since the switch is an over-center snap-acting switch, the circuit to the motor remains broken and the motor can only be restarted by pushing on the reset button 62 to return the switch to the position illustrated in FIG. 4.

Thus, the motor driven speed reducer of this invention, which includes a motor and a speed responsive clutch and differential reducer concentrically arranged with respect to the motor shaft, is protected against both under-speed and over-torque conditions of load. While for purposes of illustration, one form of this invention has been disclosed, other forms thereof may become apparent to those skilled in the art upon reference to this disclosure and, therefore, this invention is to be limited only by the scope of the appended claims.

I claim as my invention:

1. A motorized speed reducer comprising an electric motor, a shaft rotated by the motor, a speed responsive clutch concentrically arranged about the shaft and including a driving part carried and driven by the shaft, a driven part rotatably carried by the shaft and means responsive to the speed of rotation of the shaft for connecting the driven part to the driving part for rotation thereby when the speed of rotation of the shaft reaches a predetermined value, a differential reducer carried by the motor and concentrically arranged about the shaft and including a driving part rotatably carried by the shaft and driven by the driven part of the clutch and a driven part rotatably receiving the shaft and driven by the driving part at reduced speed, a control device for the motor, and means responsive to the torque load on the differential reducer for operating the control device to stop operation of the motor when the torque load exceeds a predetermined value, whereby said electric motor is protected against under-speed and over-torque conditions.

2. A motorized speed reducer comprising an electric motor, a shaft rotated by the motor, a speed responsive clutch concentrically arranged about the shaft and including a driving part carried and driven by the shaft, a driven part rotatably carried by the shaft and means responsive to the speed of rotation of the shaft for connecting the driven part to the driving part for rotation thereby when the speed of rotation of the shaft reaches a predetermined value, a differential reducer carried by the motor and concentrically arranged about the shaft and including an eccentric rotatably carried by the shaft and driven by the driven part of the clutch, an oscillating member oscillated by the eccentric and having a pair of rings of teeth thereon, a first gear member having teeth meshing with one of the rings of teeth on the oscillating member for controlling the oscillating member and a second gear member rotatably receiving the shaft and having teeth meshing with the other ring of teeth on the oscillating member and driven thereby at reduced speed, means for resiliently securing the first gear member against rotation but allowing rotative movement thereof when the torque load on the differential reducer reaches a predetermined value, and a control device for the motor operated by movement of the first gear member to stop operation of the motor when said torque load exceeds said predetermined value, whereby said electric motor is protected against under-speed and over-torque conditions.

References Cited in the file of this patent

UNITED STATES PATENTS

| | | |
|---|---|---|
| 1,192,627 | Hatlee | July 25, 1916 |
| 1,218,236 | Backscheider | Mar. 6, 1917 |
| 1,727,885 | Johnson | Sept. 10, 1929 |
| 1,833,648 | Johnson | Nov. 24, 1931 |
| 2,375,909 | Fawick | May 15, 1945 |
| 2,438,545 | Davidson | Mar. 30, 1948 |
| 2,753,031 | Light | July 3, 1956 |
| 2,764,272 | Reynolds | Sept. 25, 1956 |